United States Patent
Barb et al.

(10) Patent No.: US 6,814,543 B2
(45) Date of Patent: Nov. 9, 2004

(54) METHOD AND APPARATUS FOR BUCKET NATURAL FREQUENCY TUNING

(75) Inventors: Kevin Joseph Barb, Halfmoon, NY (US); Amir Mujezinovic, Guilderland, NY (US); Nicholas Francis Martin, Simpsonville, SC (US); Douglas Carl Hofer, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 59 days.

(21) Appl. No.: 10/334,431

(22) Filed: Dec. 30, 2002

(65) Prior Publication Data

US 2004/0126235 A1 Jul. 1, 2004

(51) Int. Cl.[7] .................................................. F01D 5/14
(52) U.S. Cl. ...................... 416/1; 416/196 R; 416/228; 416/500
(58) Field of Search .......................... 416/1, 144, 145, 416/196 R, 223 A, 224, 228, 236 R, 235, 500; 73/476, 579

(56) References Cited

U.S. PATENT DOCUMENTS

| | | | |
|---|---|---|---|
| 2,772,854 A | * 12/1956 | Anxionnaz | 416/190 |
| 4,108,573 A | * 8/1978 | Wagner | 416/236 A |
| 5,116,200 A | 5/1992 | Catlow et al. | |
| 5,393,200 A | 2/1995 | Dinh et al. | |
| 5,480,285 A | 1/1996 | Patel et al. | |
| 5,509,784 A | 4/1996 | Caruso et al. | |
| 5,829,955 A | 11/1998 | Saito et al. | |
| 5,931,641 A | 8/1999 | Finn et al. | |
| 5,974,882 A | * 11/1999 | Heath | 73/579 |
| 5,988,982 A | 11/1999 | Clauer | |
| 6,139,278 A | 10/2000 | Mowbray et al. | |
| 6,152,684 A | 11/2000 | Ferme et al. | |
| 6,224,341 B1 | 5/2001 | Fricke | |
| 6,260,269 B1 | 7/2001 | Turnquist et al. | |
| 6,322,323 B1 | 11/2001 | Komiyama et al. | |
| 6,341,941 B1 | 1/2002 | Namura et al. | |
| 6,415,206 B1 | 7/2002 | Ventres | |
| 6,435,834 B1 | 8/2002 | Reluzco et al. | |
| 6,471,482 B2 | 10/2002 | Montgomery et al. | |

* cited by examiner

*Primary Examiner*—F. Daniel Lopez
*Assistant Examiner*—Dwayne White
(74) *Attorney, Agent, or Firm*—Armstrong Teasdale LLP

(57) ABSTRACT

A method of modifying a rotor blade, and a rotor blade are provided. The rotor blade is for a steam turbine and it is modified to facilitate altering a natural vibratory frequency of the rotor blade, the rotor blade includes a leading edge, a trailing edge, a first sidewall, and a second sidewall, wherein the first and second sidewalls are connected axially at the leading and trailing edges, and the sidewalls extending radially between a rotor blade root to a rotor blade tip. The method includes determining a vibratory resonance condition of the rotor blade and forming a blade extension between the rotor blade root and the rotor blade tip that alters the determined resonance condition.

23 Claims, 2 Drawing Sheets

METHOD AND APPARATUS FOR BUCKET NATURAL FREQUENCY TUNING

BACKGROUND OF THE INVENTION

This invention relates generally to turbines and more particularly, to a method and apparatus for tuning a natural frequency response of turbine blading.

A rotating turbine blade, also known as a bucket, converts energy from flowing fluid into mechanical energy. The reliability and performance of these blades is important for the successful operation of a turbine. Metallurgical examinations of failed blades show that many failures may be attributed to a fatigue of metal.

Fatigue failure may be caused by fluctuating forces in combination with steady forces. More specifically, turbine blades may experience fluctuating forces when they rotate through non-uniform fluid flow downstream from stationary vanes, also known as nozzles, positioned between adjacent rows of blades. A basic design consideration for turbines is to avoid or to facilitate minimizing resonance with natural frequencies, and the dynamic stresses produced by fluctuating forces.

The dynamic behavior of a rotating turbine blade, row of blades or the bladed disc assembly, to which the blades are coupled, may be predicted using vibration analysis of mechanical structures. In some known methods of blade design, a natural frequency analysis is based on an assumption of a single beam cantilevered at the blade root. In some other known methods, groups of blades are connected by shrouding. However, because the groups behave as a system, many more natural frequencies and modes exist which may not be predicted using single blade analysis. Moreover, the magnitude of frequencies and the number of modes depends on the number of blades in the group and the stiffness of the shrouding.

Each blade on a rotating turbine disc experiences a dynamic force when rotated through a non-uniform flow from stationary vanes. As blades rotate through areas of non-uniform flow, they may exhibit a dynamic response, such as, for example, stress, displacements, etc.

Additionally, a turbine bladed disc may be induced into a state of vibration wherein the energy build up is a maximum. This is exemplified by areas of the blade or disc where the stress or displacement is at a maximum level, and the resistance to the exciting force of the blade or disc is at a minimum. Such a condition is known as a state of resonance. When analysis or empirical testing indicates a turbine rotor may encounter a resonance condition during operation of the turbine, steps may be taken to facilitate minimizing the probability of encountering resonance. Some known methods of altering a resonance response in a rotor include changing the number of blades in a packet, changing the number of nozzles, modifying blade flexibility, modifying wheel flexibility, changing shroud flexibility, and move the operating speed range. However, such methods may only be cost-effective during a design phase of the turbine and are impractical after the design of the turbine components has been fixed.

BRIEF DESCRIPTION OF THE INVENTION

In one aspect, a method of modifying a rotor blade for a steam turbine to facilitate altering a natural vibratory frequency of the rotor blade is provided. The rotor blade includes a leading edge, a trailing edge, a first sidewall, and a second sidewall, wherein the first and second sidewalls are connected axially at the leading and trailing edges, and extend radially between a rotor blade root and a rotor blade tip. The method includes determining a vibratory resonance condition of the rotor blade, and forming a blade extension between the rotor blade root and the rotor blade tip that alters the determined resonance condition.

In another aspect, a rotor blade for a steam turbine that includes at least one stage is provided. More specifically, the stage includes a row of rotor blades and a row of adjacent stationary nozzles, each said rotor blade includes a leading edge, a trailing edge, a first sidewall, and a second sidewall wherein, the first and second sidewalls are connected axially at the leading and trailing edges, and extend radially between a rotor blade root and a rotor blade tip wherein the rotor blade includes a first natural frequency, and a blade extension that modifies a natural frequency of the rotor blade from the first natural frequency to a second natural frequency different from the first natural frequency wherein the extension protrudes from at least one of the leading edge, the trailing edge, the first sidewall, and the second sidewall.

In yet another aspect, a multi-stage steam turbine is provided. The turbine includes a plurality of rows of rotor blades coupled circumferentially around a turbine rotor shaft. Each blade includes a leading edge, a trailing edge, a first sidewall, and a second sidewall, the first and second sidewalls are connected axially at the leading and trailing edges, and extend radially between a rotor blade root and a rotor blade tip, adjacent rows of rotor blades are separated by a row of stationary nozzles that extend circumferentially between adjacent rows of rotor blades, and each rotor blade includes a blade extension that modifies a natural frequency of said rotor blade from a first natural frequency to a second natural frequency different from said first natural frequency, said extension protruding from at least one of said leading edge, said trailing edge, said first sidewall, and said second sidewall.

DETAILED DESCRIPTION OF THE INVENTION

Figure 1:
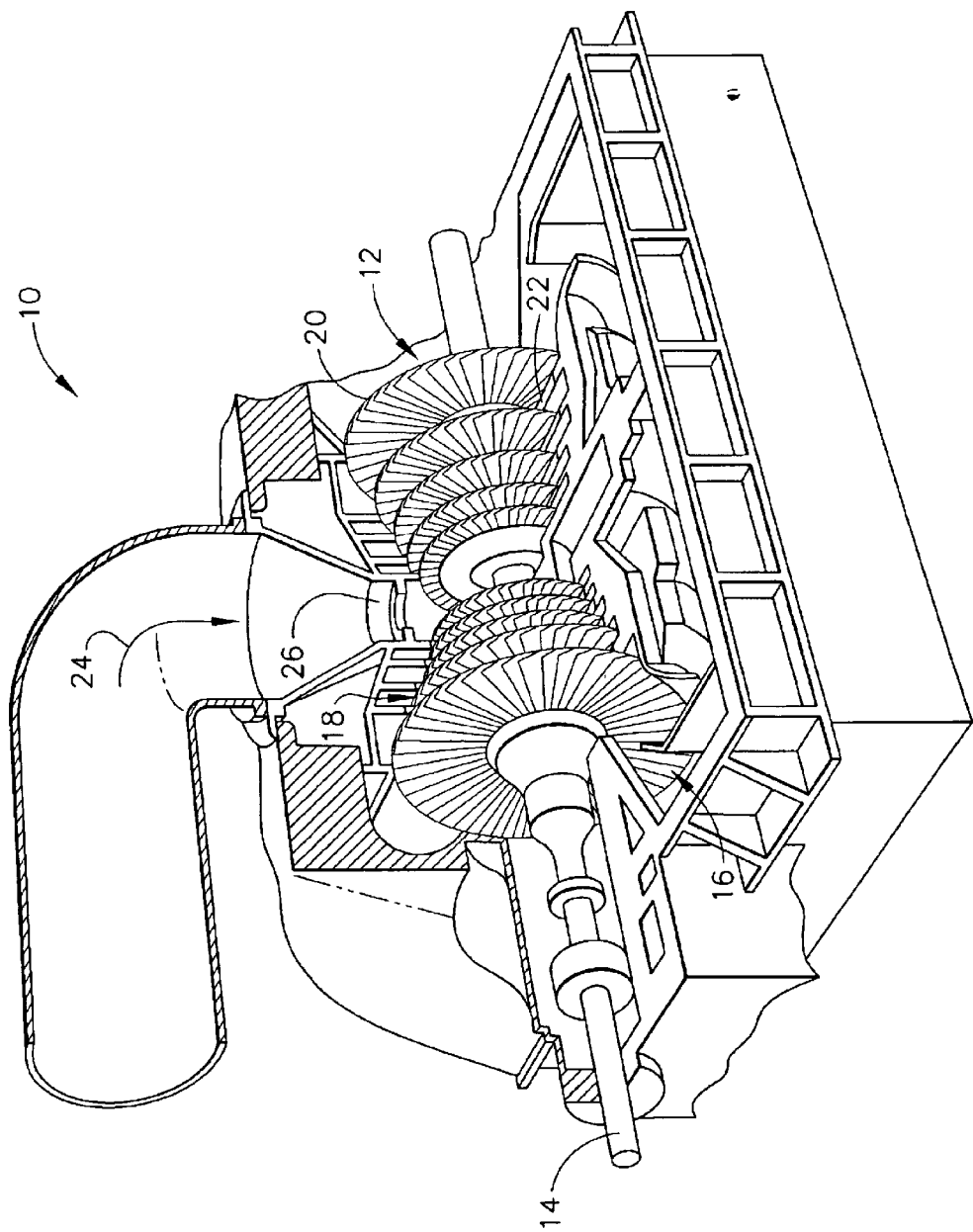
FIG. 1 is a perspective partial cut away view of a steam turbine.

FIG. 1 is a perspective partial cut away view of a steam turbine 10 including a rotor 12 that includes a shaft 14 and a low-pressure (LP) turbine 16. LP turbine 16 includes a plurality of axially spaced rotor wheels 18. A plurality of buckets 20 are mechanically coupled to each rotor wheel 18. More specifically, buckets 20 are arranged in rows that extend circumferentially around each rotor wheel 18. A plurality of stationary nozzles 22 extend circumferentially around shaft 14 and are axially positioned between adjacent rows of buckets 20. Nozzles 22 cooperate with buckets 20 to form a turbine stage and to define a portion of a steam flow path through turbine 10.

In operation, steam 24 enters an inlet 26 of turbine 10 and is channeled through nozzles 22. Nozzles 22 direct steam 24 downstream against buckets 20. Steam 24 passes through the remaining stages imparting a force on buckets 20 causing rotor 12 to rotate. At least one end of turbine 10 may extend axially away from rotor 12 and may be attached to a load or machinery (not shown), such as, but not limited to, a generator, and/or another turbine. Accordingly, a large steam turbine unit may actually include several turbines that are all co-axially coupled to the same shaft 14. Such a unit may, for example, include a high-pressure turbine coupled to an intermediate-pressure turbine, which is coupled to a low-pressure turbine. In one embodiment, steam turbine 10 is commercially available from General Electric Power Systems, Schenectady, N.Y.

Figure 2:
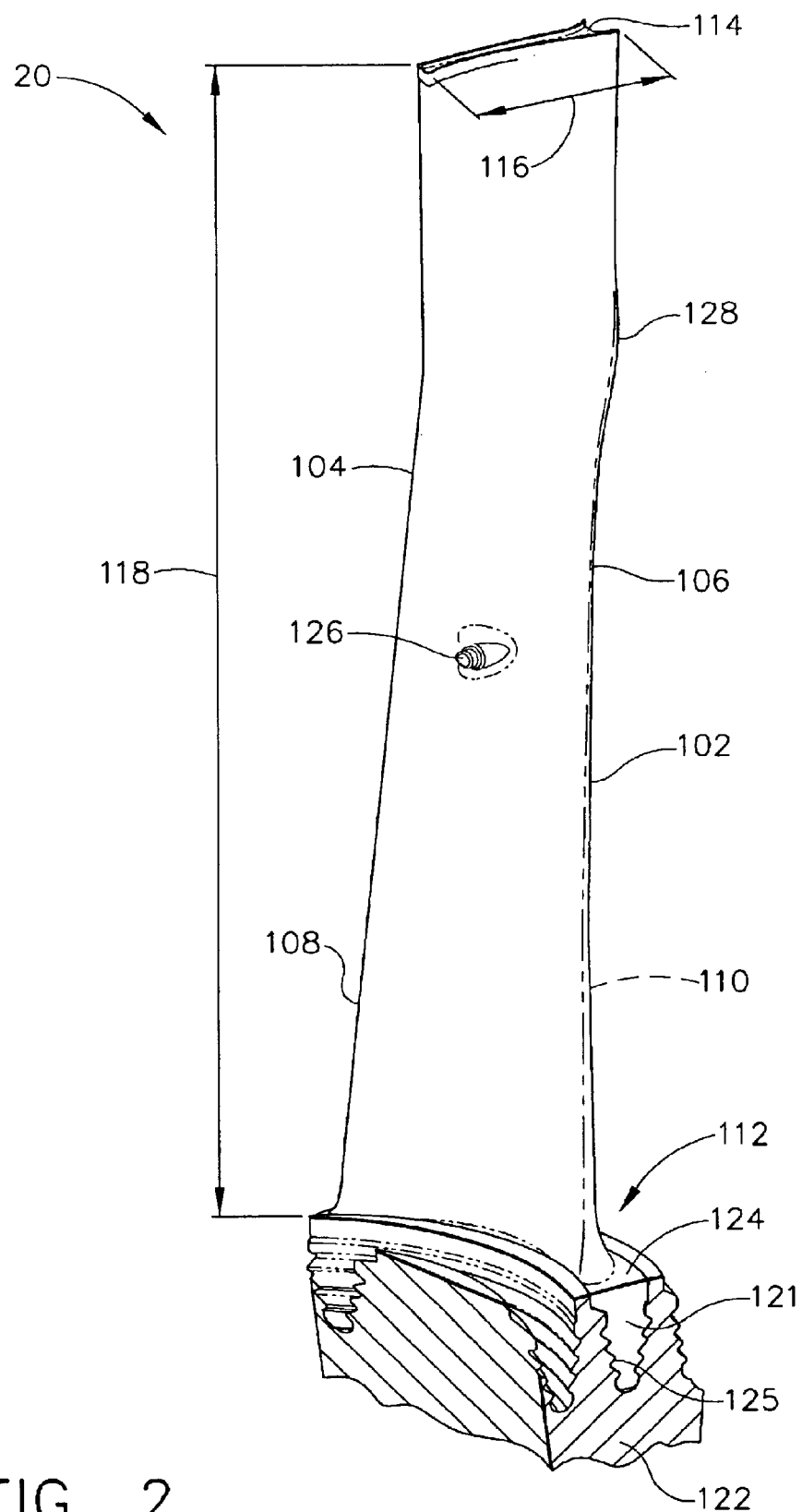
FIG. 2 is a perspective view of a turbine bucket that may be used with the steam turbine shown in FIG. 1.

FIG. 2 is a perspective view of a turbine bucket 20 that may be used with turbine 10. Bucket 20 includes a blade portion 102 that includes a trailing edge 104 and a leading edge 106, wherein steam flows generally from leading edge 106 to trailing edge 104. Bucket 20 also includes a first concave sidewall 108 and a second convex sidewall 110. First sidewall 108 and second sidewall 110 are connected axially at trailing edge 104 and leading edge 106, and extend radially between a rotor blade root 112 and a rotor blade tip 114. A blade chord distance 116 is a distance measured from trailing edge 104 to leading edge 106 at any point along a radial length 118 of blade 102. In the exemplary embodiment, radial length 118 is approximately forty inches. In another embodiment, length 118 is approximately forty-eight inches. Although radial length 118 is described herein as being equal to approximately forty inches or approximately forty-eight inches in separate embodiments, it will be understood that radial length 118 may be any suitable length for radial length 118 depending on an application. Root 112 includes a dovetail 121 used for coupling bucket 20 to a rotor disc 122 along shaft 14, and a blade platform 124 that determines a portion of a flow path through each bucket 20. In the exemplary embodiment, dovetail 121 is a curved axial entry dovetail that engages a mating slot 125 defined in rotor disc 122.

In the exemplary embodiment, first and second sidewalls, 108 and 110, each include a mid-blade connection point 126 positioned between blade root 112 and blade tip 114 and used to couple adjacent buckets 20 together. In one embodiment, mid-blade connection point 126 is used to couple adjacent buckets 20 together with tie wires (not shown) to facilitate improving a vibratory response of buckets 20 in a mid region between root 112 and tip 114.

An extension 128 is formed on a portion of blade 102 to alter the vibratory response of blade 102. Extension 128 may be formed on blade 102 after a design of blade 102, blade 102 has been fabricated, and has undergone production testing. At a particular point along radial length 118, a chord distance 116 defines a shape of blade 102. In one embodiment, extension 128 is formed by adding blade material to blade 102 such that at radial distance 118 where the blade material is added, chord distance 116 is extended past leading edge 106 and/or trailing edge 104 of blade 102 as originally formed. In another embodiment, blade material is removed from blade 102 such that at radial distance 118 where blade material has not been removed, chord distance 116 extends past leading edge 106 and/or trailing edge 104 of blade 102 as modified by removing material. In a further embodiment, extension 128 is formed integrally and material at extension 128 may be removed to tune each bucket as dictated by testing. Extension 128 is formed to coincide with an aerodynamic shape of blade 102 so as to facilitate minimizing a flow disturbance of steam 24 as it passes extension 128.

During design and manufacture of bucket 20, a profile of blade 102 is determined and implemented. A profile being a cross-sectional view of blade 102 taken at radial distance 118. A series of profiles of blade 102 taken at subdivisions of radial distance 118 define a shape of blade 102. The shape of blade 102 is a component of an aerodynamic performance of blade 102. After blade 102 has been manufactured the shape of blade 102 is relatively fixed, in that altering the shape of blade 102 may alter the vibratory response in an undesired way. In some known instances, it may be desirable to alter the vibratory response of blade 102 after blade 102 has been manufactured, such as during a post-manufacturing testing process. In order to maintain a predetermined performance of blade 102, the shape of blade 102 may be modified in such a way, as determined by analysis, such as by computer analysis or by empirical study to add mass to blade 102 that alters the vibratory response of blade 102. The analysis determines an optimum amount of mass needed to achieve a desired alteration of the vibratory response of blade 102. Modifying blade 102 with extension 128 to add mass to blade 102, tends to decrease the natural frequency of blade 102. Modifying blade 102 with extension 128 to remove mass from blade 102, tends to increase the natural frequency of blade 102. Extension 128 may also be crafted to alter an aeromechanical characteristic of blade 102 such that an aerodynamic response of blade 102 to a flow of steam 24 past extension 128 will create a desirable change in the vibratory response of blade 102. Thus, the addition of extension 128 may alter the vibratory response of blade 102 in at least two ways, a change of mass of blade 102 and a modification of the airfoil shape of blade 102. Extension 128 may be designed to utilize both aspects of adding mass and changing airfoil shape to effect a change in the vibratory response of blade 102.

In operation, blade 102 undergoes a testing process to validate design requirements were met during the manufacturing process. One known test indicates a natural frequency of blade 102. Modem design and manufacturing techniques are tending toward buckets 20 that are thinner in profile. A thinner profile tends to lower the overall natural frequencies of blade 102. Lowering the natural frequency of blade 102 into the domain of the vibratory forces present in turbine 10, may cause a resonance condition in any number or in an increased number of system modes that each will be de-tuned. To modify the natural frequency of blade 102, mass may be added to or removed from blade 102. To facilitate limiting lowering the natural frequency of blade 102 into the domain of the vibratory forces present in turbine 10, a minimum amount of mass is added to blade 102. In the exemplary embodiment, extension 128 is machined from a forged material envelope of leading edge 106 of blade 102. In other embodiments, extension 128 may be coupled to blade 102 using other processes. In the exemplary embodiment, extension 128 is coupled to blade 102 between connection point 126 and blade tip 114. In other embodiments, extension 128 may be coupled to leading edge 106 between blade root 112 and blade tip 114, to trailing edge 104 between blade root 112 and blade tip 114, or may be added to sidewalls 108 and/or 110.

The above-described turbine rotor blade extension is cost effective and highly reliable. The turbine rotor blade includes a first and second sidewall coupled to each other at their respective leading edge and trailing edge. An extension coupled to the blade, or removed from the blade forged material envelope alters the blade natural frequency and improves reliability. The amount of material in the extension is facilitated to be minimized by analysis or testing of the rotor blade. Minimizing this mass addition reduces to total weight of the blade, thus minimizing both blade and disk stress and improves reliability. As a result, the turbine rotor blade extension facilitates operating a steam turbine in a cost effective and reliable manner.

Exemplary embodiments of turbine rotor blades are described above in detail. The turbine rotor blades are not limited to the specific embodiments described herein, but rather, components of the turbine rotor blade may be utilized independently and separately from other components described herein. Each turbine rotor blade component can also be used in combination with other turbine rotor blade components.

While the invention has been described in terms of various specific embodiments, those skilled in the art will recognize that the invention can be practiced with modification within the spirit and scope of the claims.

What is claimed is:

1. A method of modifying a rotor blade for a steam turbine to facilitate altering a natural vibratory frequency of the rotor blade, the rotor blade including a leading edge, a trailing edge, a first sidewall, and a second sidewall, the first and second sidewalls connected axially at the leading and trailing edges, and extending radially between a rotor blade root and a rotor blade tip, said method comprising the steps of:
   determining a vibratory resonance condition of the rotor blade; and
   forming a chordwise extension of the rotor blade on at least one of a leading edge of the blade and a trailing edge of the blade between the rotor blade root and the rotor blade tip that alters the determined resonance condition.

2. A method in accordance with claim 1 wherein determining a vibratory resonance condition of the rotor blade comprises determining a vibratory resonance condition of the rotor blade using a finite element model.

3. A method in accordance with claim 1 wherein determining a vibratory resonance condition of the rotor blade comprises determining a vibratory resonance condition of the rotor blade using at least one of vibration analysis and vibration testing.

4. A method in accordance with claim 1 wherein the rotor blade includes a mid-blade connection point and wherein forming a chordwise extension of the rotor blade further comprises forming a chordwise extension of the rotor blade of the rotor blade between the mid-blade connection point and the blade tip.

5. A method in accordance with claim 1 wherein forming a blade extension comprises forming an extension of at least one of a first sidewall and a second sidewall of the blade.

6. A method in accordance with claim 1 wherein a mass of the rotor blade is altered to modify the vibratory resonance condition of the rotor blade and wherein forming a blade extension comprises:
   determining a vibratory resonance condition limit of the rotor blade; and
   determining at least one of an amount of material to be added to form the blade extension, and an amount of material to be removed to form the blade extension, such that a vibratory resonance condition of the rotor blade with the extension is within the determined vibratory resonance condition limit of the rotor blade, and such that the amount of material added or removed is facilitated to be substantially minimized.

7. A rotor blade for a steam turbine including at least one stage, the stage formed from a row of rotor blades and a row of adjacent stationary nozzles, said rotor blade comprising:
   a leading edge, a trailing edge, a first sidewall, and a second sidewall, said first and second sidewalls connected axially at said leading and trailing edges, and extending radially between a rotor blade root and a rotor blade tip, said rotor blade includes a first natural frequency; and
   a chordwise blade extension that modifies a natural frequency of said rotor blade from said first natural frequency to a second natural frequency different from said first natural frequency, said extension protruding from at least one of said leading edge and said trailing edge.

8. A rotor blade in accordance with claim 7 wherein said rotor blade further comprises a mid-blade connection point and wherein said extension is formed on said blade between said mid-blade connection point and said blade tip.

9. A rotor blade in accordance with claim 7 wherein said extension protrudes from at least one of said first sidewall of said rotor blade and said second sidewall of said rotor blade.

10. A rotor blade in accordance with claim 7 wherein said extension is integrally formed with said blade.

11. A rotor blade in accordance with claim 7 wherein said extension is formed by removing blade material from said blade.

12. A rotor blade in accordance with claim 7 wherein said extension increases a natural frequency of said rotor blade.

13. A rotor blade in accordance with claim 7 wherein said extension is coupled to said blade by a welding process.

14. A rotor blade in accordance with claim 7 wherein said extension extends afterward from said trailing edge of said blade.

15. A multi-stage steam turbine comprising:
   a plurality of rows of rotor blades coupled circumferentially around a turbine rotor shaft, each said rotor blade comprises a leading edge, a trailing edge, a first sidewall, and a second sidewall, said first and second sidewalls coupled axially at said leading and trailing edges, and extends radially between a rotor blade root and a rotor blade tip;
   a plurality of stationary nozzles that extend between adjacent rows of said rotor blades; and
   a chordwise blade extension that modifies a natural frequency of said rotor blade from a first natural frequency to a second natural frequency different from said first natural frequency, said extension protruding from at least one of said leading edge and said trailing edge.

16. A steam turbine in accordance with claim 15 wherein each said rotor blade further comprises a mid-blade connection point and wherein said extension is formed on said blade between said mid-blade connection point and said blade tip.

17. A steam turbine in accordance with claim 15 wherein said extension protrudes from at least one of said first sidewall of said rotor blade and said second sidewall of said rotor blade.

18. A steam turbine in accordance with claim 15 wherein said extension is integrally formed with said blade.

19. A steam turbine in accordance with claim 15 wherein said extension is formed by removing blade material from said blade.

20. A steam turbine in accordance with claim 15 wherein said extension increases a natural frequency of said rotor blade.

21. A steam turbine in accordance with claim 15 wherein said extension is coupled to said blade by a welding process.

22. A steam turbine in accordance with claim 15 wherein said extension extends afterward from said trailing edge of said blade.

23. A steam turbine in accordance with claim 15 wherein said extension is coupled to a blade in a final stage of a low-pressure turbine.

* * * * *

UNITED STATES PATENT AND TRADEMARK OFFICE
CERTIFICATE OF CORRECTION

PATENT NO. : 6,814,543 B2 Page 1 of 1
APPLICATION NO. : 10/334431
DATED : November 9, 2004
INVENTOR(S) : Barb et al.

It is certified that error appears in the above-identified patent and that said Letters Patent is hereby corrected as shown below:

In Claim 14, column 6, line 24, delete "afterward" and insert therefore -- aftward --.

In Claim 22, column 6, line 61, delete "afterward" and insert therefore -- aftward --.

Signed and Sealed this

Eighth Day of August, 2006

JON W. DUDAS
*Director of the United States Patent and Trademark Office*